United States Patent [19]

Thanos et al.

[11] Patent Number: 5,227,930
[45] Date of Patent: Jul. 13, 1993

[54] HEAD POSITION RECALIBRATION FOR DISK DRIVE

[75] Inventors: William N. Thanos, San Jose; Misha I. Rozenberg, Pacifica; Tom L. Lee, San Jose; Thomas R. Stone, San Francisco, all of Calif.

[73] Assignee: Quantum Corporation, Milpitas, Calif.

[21] Appl. No.: 556,945

[22] Filed: Jul. 20, 1990

[51] Int. Cl.[5] .............................................. G11B 5/596
[52] U.S. Cl. ............................ 360/78.04; 360/77.03; 360/77.04; 360/77.05
[58] Field of Search ............... 360/73.03, 77.03, 77.04, 360/77.08, 78.11, 78.14, 78.04; 364/167.1

[56] References Cited

U.S. PATENT DOCUMENTS

| | | | |
|---|---|---|---|
| 3,881,184 | 4/1975 | Koepcke et al. | 360/78 |
| 4,135,217 | 1/1979 | Jacques et al. | 360/77 |
| 4,593,194 | 6/1986 | Graham et al. | 250/231 |
| 4,638,384 | 1/1987 | Stewart et al. | 360/77 |
| 4,639,798 | 1/1987 | Harrison et al. | 360/73.03 |
| 4,647,769 | 3/1987 | Stone et al. | 250/231 |
| 4,661,696 | 4/1987 | Stone | 250/231 |
| 4,772,974 | 9/1988 | Moon et al. | 360/98 |
| 4,878,135 | 10/1989 | Makino et al. | 360/78.11 |
| 4,920,434 | 4/1990 | Brown et al. | 360/77.03 |
| 5,005,089 | 4/1991 | Thanos et al. | 360/77.08 |

Primary Examiner—Andrew L. Sniezek
Assistant Examiner—Varsha V. Sheladia
Attorney, Agent, or Firm—David B. Harrison

[57] ABSTRACT

A disk drive includes at least one reference track having a plurality of sectors which are read and averaged in order to compensate for spindle offset. The disk drive has a head position servo system controls a head position actuator and includes a polyphase optical encoder which is initially calibrated by reference to dark current values and recalibrated periodically by reference to the reference track. Preferably, at least two reference tracks are located at the extremes of the radial displacement of the actuator so that variations in gap dimension between a scale mounted to the actuator and a fixed reticle-mask over a photodetector array of the encoder may be measured and compensated for. The method for initializing the drive and for periodically updating its calibration of the encoder and the head position servo is also described.

16 Claims, 8 Drawing Sheets

HEAD POSITION RECALIBRATION FOR DISK DRIVE

FIELD OF THE INVENTION

The present invention relates to disk drives including mass balanced rotary head positioners and polyphase optical encoders coupled thereto, and with position information embedded on the data surfaces of the storage disks in order to increase data track densities. More particularly, the present invention relates to a position recalibration method and apparatus for compensating for system tolerances including spindle runout and other drifts and variations occurring within the disk drive.

BACKGROUND OF THE INVENTION

Data transducer head positioners employ both open and closed servo loop technologies in order to move the data transducer head among concentric data storage tracks of a rotating storage disk coated with magnetic storage media during track seeking operations, and to keep the data transducer head aligned with each selected data track during track following operations, when data is being read from or written to the data track being followed. The head positioner structure includes an actuator for translating electrical driving currents into motion to move the head back and forth in a general radial direction across the data storage surface, and to maintain the head in alignment with each selected track during track following operations.

In order to position the head, a driving amplifier converts position error signals into the driving currents which flow through the actuator coil. The position error signal may be developed by servo feedback information provided from a dedicated servo surface of the disk, or it may be provided on a sampled and held basis from servo sectors recorded in interleave fashion with data sectors in one or more of the concentric data tracks, or it may be derived from an external transducer, such as a polyphase optical transducer coupled to the actuator structure.

The object of the position error signal is to effectuate a correspondence between a nominal track centerline and the actual track centerline during track following operations; and, to keep the head moving along a radial seeking locus in accordance with a desired seeking profile during track seeking operations.

The assignee of the present invention has pioneered the development of fixed disk drives employing a mass balanced rotary actuator with a polyphase optical transducer having a microline scale closely coupled to the rotating arm of the actuator, and further having prerecorded servo correction information periodically sampled from the disk surface and held to correct the position information provided by the optical transducer. Examples of disk drives employing this technology are to be found in commonly assigned, or commonly owned and cross-licensed patents, including by way of example U.S. Pat. No. 4,396,959 (now U.S. Reissue Patent Re 32,075 and also see U.S. Pat. No. 4,920,434 based on same disclosure); U.S. Pat. Nos. 4,639,798; 4,639,863; 4,858,034; and U.S. patent application Ser. No. 07/192,353, filed on May 10, 1988, now U.S. Pat. No. 5,005,089.

While the head positioner servo loop architecture employed in the disk drives described in these patents has worked very well, as the need for a greater number of data tracks has continued to grow, the density of concentric data tracks with reference to a given small diameter data storage surface has become limited by a number of factors relating to spindle offset tolerances and other tolerances found within the disk drive.

A first limitation is related to spindle offset tolerances. In these examples of prior disk drives, the data storage disk(s) is mounted to a spindle by a clamping mechanism. The servo correction information provided on the disk storage surface is prerecorded at the factory by using the polyphase position transducer and other circuitry and programming to perform a servo writer function. The servo correction information is written when the head and disk assembly has reached a nominal operating temperature after a warm-up period.

Unfortunately, over time, the data storage disk may shift slightly with respect to the rotational axis of the spindle, leading to an offset characteristic. This offset may be due to repeated thermal cycles as the disk drive is turned on and off, or it may be due to application of a shock force, particularly likely if the drive is included within small, portable equipment, such as laptop computers which are carried about and subjected to jarring and dropping, etc.

The drawback of spindle offset is that data written on one circular locus deemed to be a data track centerline at one time may not be capable of being read later on if the disk develops an offset with respect to the disk spindle axis of rotation, leading to eccentricity of the original track centerline relative to the spindle axis of rotation. Also, writing data on a track of a disk having an offset may result in the loss of data earlier written on an adjacent concentric data track before the offset developed.

There have been a number of prior approaches to the solution of spindle offset, particularly with respect to removable disk packs. One example is provided in the Chick et al. U.S. Pat. No. 4,136,365 which teaches the use of two adjacent reference loci prerecorded with a phase coherent tri-bit pattern throughout their circumferential extent. The servo pattern is periodically accessed by the data transducer head during interruptions in data transfers, and thermal drift as well as offset is measured and recorded in memory for later use in correcting head position over data tracks. A scheme using an outer reference track, an inner reference track and interpolation between the two tracks is also suggested by the Chick et al. patent.

A sampled sector offset correction arrangement is disclosed in the Jacques et al. U.S. Pat. No. 4,135,217 which provided a number of embedded servo sectors, such as 24 sectors, within each data track. A microprocessor was used in the Jacques et al. disk drive to process samples of the servo information read from each sector in order to generate an offset prediction value for correcting head position. The drawback of these approaches has been the relative complexity needed to generate and apply an offset (eccentricity) error signal to the servo loop summing junction to correct for offset, particularly in the case of fixed disks.

Thus, one hitherto unsolved need has arisen for a more simplified, yet effective mechanism for compensating for spindle offset tolerances within a fixed disk drive.

A second limitation has been associated with electrical drifts within or related to the polyphase encoder. It is known to derive two electrical, phase related signals P1 and P2 from the polyphase position encoder which is mounted to the disk drive base and which has a moveable microline scale closely coupled to the drive's rotary actuator structure. The phase signals P1 and P2 resulting from relative transmission of light photons through the scale and reticle-masked photodetector array are most desirably nominally in phase quadrature (i.e. 90 degree phase lead/lag between P1 and P2). By use of arc tangent based algorithms or table lookups, it is practical to combine the P1/P2 sine/cosine values in order to derive e.g. 128 equal angle positions for each track, with 512 angle positions being equal to one complete optical cycle of each of the P1 and P2 phases (one cycle resolving radial head position for four adjacent data tracks). Thus, for the track extending between position zero and position 127, centerline is nominally at position 63. For the track extending from position 128 to position 255, centerline is nominally at position 191. For the track extending from position 256 to position 383, centerline is nominally at angle position 319. And, for the track extending from position 394 to 511, track centerline is nominally at angle position 457. (See FIG. 11 and discussion of encoder circle hereinafter).

When in quadrature relationship and after setup calibration procedures are completed, the P1 and P2 optical phase signals are most preferably close approximates of sine and cosine waves as the scale moves relative to the photodetector array. During such movement and when P1 amplitude is plotted on e.g. the vertical axis and when P2 amplitude is plotted on e.g. the horizontal axis, a circle lissajous results. This encoder circle or lissajous has been referred to as a "circle servo", which is a shorthand expression for describing this particular implementation and use of the P1 and P2 phase signals and resultant encoder circle.

Phase lead and lag of the phases P1 and P2 may be trimmed by rotational adjustment of the optical encoder assembly relative to the scale mounted to the rotary actuator as is taught for example by commonly assigned U.S. Pat. No. 4,647,769, the disclosure thereof being incorporated herein by reference. Also symmetry of the circle lissajous is established and promoted by providing highly collimated light energy. This may be achieved by placing the LED at right angles to the scale and reticle and using a mirror to redirect the light path toward the scale and reticle as was done for example in commonly owned and cross-licensed U.S. Pat. No. 4,703,176.

Most desirably, in order for the positional vernier of 128 positions per track to be realized, the full dynamic range of the analog to digital converter should be employed during the conversion of the P1 and P2 analog signals into digital values. Accordingly, the lissajous diameter should be made as large as possible without becoming saturated or distorted. However, the diameter of the P1/P2 circle lissajous is subject to variations, due primarily to changes in gap dimension between the scale and the reticle and also due to changes in light source output, drift of electrical component values and characteristics. Whereas in prior disk drive designs the scale was mounted on a very rigid scale mounting arm structure extending from the rotary actuator assembly, if the mass of the mounting arm structure is reduced in order to reduce power consumption requirements of the rotary actuator, and/or shorten track accessing times during seeking and resultant data throughput rates, it becomes increasingly difficult to maintain precisely the desired gap dimension between the scale and the reticle masking the photodetector array.

Commonly assigned U.S. Pat. No. 4,593,194 describes an optical encoder having digital gain compensation for controlling light intensity. As each photodetector was polled and its output digitized, the microcontroller adjusted the light source (LED) by a computed value. This prior approach required microcontroller activity for making the LED adjustment each time that a P1 or P2 phase was digitized. Also, because only two photodetectors were employed in the optical encoder array to provide the P1 and P2 phase signals, common mode rejection with consequent improved noise immunity was not available.

Also, when the line spacing of the scale is reduced in order to define more tracks which are closer together, the need for highly collimated light and minimization of penumbra effects is heightened.

Thus, a second hitherto unsolved need has remained for a more efficient method for an arrangement within an optical encoder enabling greater track densities to be realized and for periodic measurement of light source amplitude and readjustment if necessary within the polyphase optical encoder in order to maximize the undistorted diameter of the circle lissajous thereby providing maximized quantization dynamic range and better noise immunity than heretofore achieved by the prior art approaches.

SUMMARY OF THE INVENTION WITH OBJECTS

A general object of the present invention is to provide an improved head positioner calibration method and apparatus within a disk drive, thereby enabling the drive to achieve increased data storage capacity in a manner which overcomes limitations and drawbacks of the prior art.

A more specific object of the present invention is to provide an initial head positioner calibration method which calibrates the disk drive head positioner servo loop to actual head position across the extent of the data storage surface of the data storage disk.

Another more specific object of the present invention is to provide an improved head position recalibration method and apparatus for a disk drive in order to compensate for errors, drifts and other changes occurring during operation of the disk drive.

One more specific object of the present invention is to provide an improved and expanded position recalibration method for a head positioner servo loop including an optical polyphase position transducer for coarse positioning and a position correction signal derived from the data surface in a manner which includes offset compensation as well as component drift compensation.

One more specific object of the present invention is to provide a plurality of servo samples for each optical phase on a data surface in a manner which enables electrical averaging and reduction of tolerances due to spindle runout.

Yet another specific object of the present invention is to provide an improved optical encoder within a disk drive having a more optimal reticle pattern enabling closer spacing of openings of a microlined scale and for providing phase adjustable optical signals in differential arrangement than heretofore achieved in an optical polyphase encoder within a disk drive.

Still a further specific object of the present invention is to provide a calibration method for calibrating a polyphase optical encoder based circle servo head positioner control loop within a disk drive.

Yet one more specific object of the present invention is to provide a method for measuring and compensating for changes in gap spacing between a moving scale and a fixed reticle of a polyphase optical encoder for use within a disk drive head positioner servo loop, for example.

Yet another specific object of the present invention is to provide a mass reduced, mass balanced rotary actuator within a disk drive including a polyphase optical encoder in which a radial microlined scale thereof is mounted to the rotary actuator.

In accordance with the principles of the present invention, a method is provided for calibrating head position of a data transducer head in a disk drive including a disk drive base, a data storage disk rotating relative to the base and having a data surface defining a multiplicity of concentric track locations, the data transducer head for writing data to and reading data from selected tracks at the locations thereof, a mass balanced rotary actuator structure journalled to the base for limited rotational displacement thereby for positioning the data transducer head at the said selected ones, a polyphase optical encoder coupled between the rotary actuator and the base for generating P1 and P2 electrical phase signals by which a plurality of adjacent ones of the said data track locations are defined over a complete cycle of one of the phase signals, and head position correction information prerecorded in at least one reference track, the method including the steps of:

calibrating the polyphase optical encoder by measuring P1 and P2 values when a light source of the optical encoder is operating in an initial reference mode, such as no light, in order to obtain a center spot of an encoder circle, commanding the light source to put out a minimum useable light level with reference to the center spot, moving the actuator structure to position the head over the reference track by reference to P1 and P2 encoder values resulting from the minimum useable light level, reading the prerecorded head position correction information from the reference track with the data transducer head, calculating a head position correction value from the head position correction information and applying the value to correct P1 and P2 encoder values in order to position the data transducer head in alignment with track centerline of the reference track, moving the data transducer head over a complete optical cycle defining the plurality of track locations and recording a circle radius for each track location, determining which track has the largest circle radius, and determining a maximum useable light level in relation to said spot and commanding the light source to put out a maximum useable light level level with respect to the track determined to have the largest circle radius.

In one aspect of the present invention the reference track includes a plurality of correction values recorded in sectors spaced about the circumference of the reference track, and wherein the step of reading the prerecorded head position correction information from the reference track with the data transducer head includes the steps of reading and recording each correction value as a signed value, summing the recorded signed correction values to produce a sum and dividing the sum by the number of values read and recorded to produce a reference centerline locus for the reference track.

In another aspect of the present invention there are plural reference tracks for each optical phase, the reference tracks being located in outer radial and inner radial zones and the plural adjacent track locations are defined by a complete cycle of an optical phase. The method comprising the further steps of reading the prerecorded head position correction information from each reference track to provide a correction value for each phase of the optical cycle and calculating a correction value for a said track location to be followed by the data transducer head by reference to a said phase of the optical cycle corresponding to the said track location.

A disk drive in accordance with the present invention includes a base, a data storage disk rotating relative to the base and having a data surface defining a multiplicity of concentric data track locations, a data transducer head for writing data to and reading from data tracks at selected ones of the data track locations, a mass balanced rotary actuator structure journalled to the base for limited rotational displacement thereby for positioning the data transducer head at the said selected ones, and a polyphase optical encoder coupled between the rotary actuator and the base for generating P1 and P2 phase signals by which the said data track locations are nominally defined. In this aspect of the present invention, a plurality servo sectors are defined at at least one servo track location and located at predetermined circumferential locations, each said servo sector including prerecorded track centerline information readible by the said data transducer head. A head position controller is responsive to the P1 and P2 phase signals for executing a calibration routine by causing the mass balanced rotary actuator structure to move the data transducer head to the said servo track location A sample circuit associated with the data transducer head sequentially samples the track centerline information of each said servo sector to produce a head position sample therefrom. An accumulator accumulates the head position samples from a said servo track location. An averager then averages the head position samples into an average centerline position value. A processor associated with the head position controller processes the average centerline position value to provide a corrected nominal track location value derived from the P1 and P2 phase signals and applies the corrected value to the head position controller.

In this aspect of the present invention the P1 and P2 phase signals are in electrical quadrature and are derived from plural optical phases of the optical encoder, and a plurality of servo track locations are provided within a contiguous region of the data storage surface wherein each said servo track location is associated with a said optical phase and further wherein the head position controller successively positions the head over the plurality of servo track locations during the calibration interval, the sample circuit sequentially sampling the head position samples from each said servo track location, the accumulator separately accumulating the samples from each said servo track location, the averager separately averaging the head position samples of each said servo track location into an average centerline position value for each said servo track location, and the processor processes a said average centerline position value for an optical phase associated with a said track location at which the data transducer head is being positioned.

The disk drive polyphase optical encoder coupled between the rotary actuator and the base for generating P1 and P2 electrical phase signals by which the said data track locations are nominally defined includes:

a mounting base adjustably secured to the disk drive base, wherein rotational adjustment of the mounting base enables phase lead lag trim between the P1 and P2 phase signals, a photodetector array formed on a single semiconductor substrate secured to the base, the integrated photodetector array including two sets of side by side photocells, a reticle-mask disposed in alignment over the photodetector array and cooperating with a scale such that a first set of photocells at a first radius of the scale respectively provide a Q1 optical phase and a BAR Q1 optical phase, and a second set at a second radius of the scale different from the first radius respectively provide a Q2 and a BAR Q2 optical phase, wherein the phases of the first set are in quadrature relationship with the phases of the second set, a first differential amplifier for differentially amplifying electrical outputs from the photocells of the first set to produce the P1 phase signal, and a second differential amplifier for differentially amplifying electrical outputs from the photocells of the second set to and wherein the photocells of the second set are differentially amplified to produce the P2 phase signal.

Preferably, the openings of the reticle-mask are made much longer than they are wide, each opening having a length to width ratio lying in a range between 45 and 60, for example.

These and other objects, aspects, advantages and features of the present invention will be more fully understood and appreciated upon consideration of the following detailed description of a preferred embodiment, presented in conjunction with the accompanying drawings.

DETAILED DESCRIPTION OF A PREFERRED EMBODIMENT

Disk Drive 10

Figure 1:
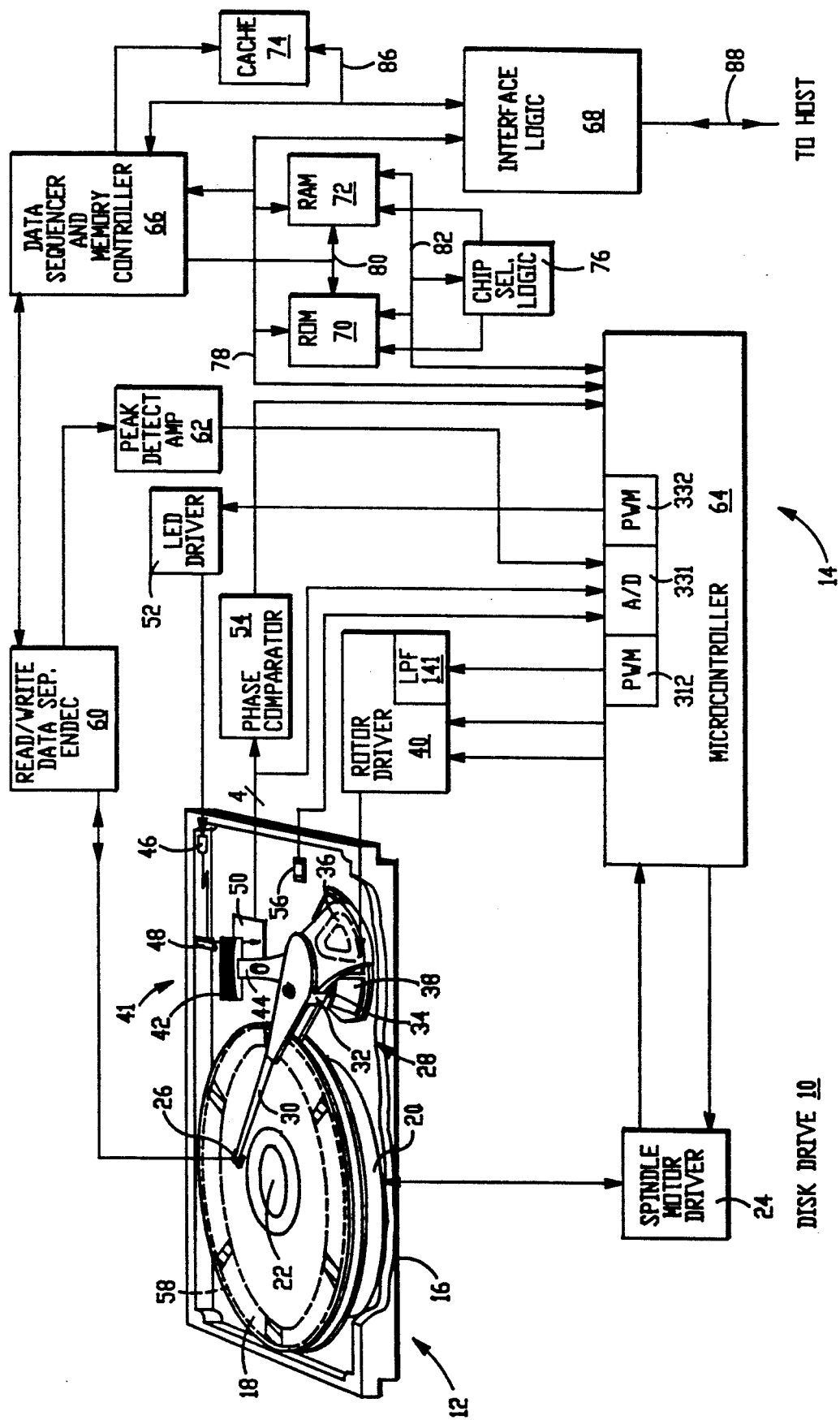
FIG. 1 is a block diagram of a disk drive having a head positioner servo loop including spindle offset compensation and an improved optical encoder arrangement in accordance with the principles of the present invention.

In order to understand and appreciate the principles of the present invention, a brief description of a fixed disk drive 10 ensues. As depicted in FIG. 1, the disk drive 10 includes an electromechanical head and disk assembly 12 and related electronics circuitry 14.

The head and disk assembly 12 typically includes a frame or base 16 which aligns and supports the other electromechanical elements forming the head and disk assembly 12. Also, the base 16, preferably formed as an injection-molded aluminum alloy casting, provides a primary radiator for radiating heat generated from the electrical components of the head and disk assembly 12. The base 16 may be formed in two parts, or a cover, not shown, is provided in order to provide a hermetically sealed environment, and in some implementations to provide increased mechanical strength and rigidity to the base and to the rotary actuator structure.

One or more of the data storage disks 18 of predetermined diameter, preferably 95 mm or smaller are mounted to the base 16, typically through a journal provided within a direct drive, brushless DC spindle motor 20 which is mounted directly to the base. The spindle motor 20 rotates the disk 18 at a predetermined angular velocity, such as 3600 RPM in a known direction. The spindle motor 20 includes a fixed stator coil and a moving magnet assembly attached to a rotatable spindle 22 to which the disk 18 is secured. Commutation sensors within the motor 20 are used to generate commutation or switching signals which enable driving currents to be generated by a spindle motor driver circuit 24 in order to rotate the disk 18. Since the spindle motor 20 is directly mounted to the base 16, heat generated in the spindle motor 20 is conducted into the base casting and ultimately dissipated by convection to the ambient environment.

Each major surface of the disk 18 is coated with a magnetic data storage media, typically a thin film media. A multiplicity of concentric data tracks are defined on each storage surface of the disk 18. A data transducer head 26 is provided for each data storage surface, and it is moved, along with all of the other heads of the drive 10, to each selected data track by a mass balanced rotary actuator structure 28. Since the data transducer heads 26 are ganged together and commonly positioned by a rotary actuator structure 28, a data track location for one disk surface is referred to as a "cylinder" address insofar as the actuator structure 28 is concerned.

The mass balanced rotary actuator structure 28 includes a load beam 30 for providing the data transducer head 26 with a preload force toward the data surface which is overcome as the disk is rotated and thereby forms an air bearing holding the head 26 closely above the data surface. A rotary head arm structure 32 is journalled to the base 16 at a post 34, and the structure 32 provides a secure mounting for the load beams 30.

A rotor coil 36 is integrally formed with the structure 32 and is disposed for limited angular displacement within a magnetic field gap formed by two pairs of permanent magnets, only the bottom magnet pair 38 being shown in FIG. 1 in order to aid clarity. Each magnet pair is mounted to a magnetic flux return plate which serves as a mounting plate for the magnets and which also serves as a return path in order to complete the magnetic circuit.

As current from a rotor driver circuit 40 is passed through the coil 36, the coil 36 generates a torque which moves the actuator structure 28 in one direction of rotation, or another, depending upon the direction of current flow through the coil 36. Current flow through the rotary actuator coil 36 provides a second significant source of heat buildup in the head and disk assembly 12. This heat is passed by conduction through the mounting post 34 to the base 16, and it also passes by convection to the adjacent magnet pairs and ultimately to the base 16 by conduction of the intermediate structural components, such as the magnet pairs and flux return plates.

An aerodynamic shipping latch is provided to latch the rotary actuator structure 28 so as to hold the position of the head 26 over an inner landing zone whenever power is removed from the data disk and there is insufficient airflow to maintain the shipping latch in a released state. This concept is described in greater detail in commonly owned, cross-licensed U.S. Pat. No. 4,647,997, the disclosure thereof being incorporated herein by reference.

In this particular disk drive 10, a polyphase actuator-position optical encoder 41 is provided (see FIG. 5, discussed hereinafter). In this regard, the actuator structure 28 further includes a glass scale 42 secured to a scale arm extension 44 of the head arm structure 32. The glass scale 42 defines a series of radial microlines which define light-translucent spaces interleaved between the light-opaque radial microlines. A light source 46 and light beam folding mirror 48 provide a source of collimated light energy which is directed through the microline region of the scale 42 toward a photodetector array 50. The photodetector array 50 includes a reticle or mask which is aligned to cooperate with the radial microlines in order to generate and put out electrical phase signals in quadrature, for example. The light source 46, mirror 48 and masked photodetector array 50 are commonly mounted to the base 16 by a mounting arrangement which enables height and rotational adjustment about an optical axis. The cells of the photodetector array and the mask patterns are symmetrically disposed on opposite sides of the optical axis. The scale 42, light source 46, mirror 48 and masked photodetector array 50 provide the optical encoder 41.

As the scale 42 moves relative to the light source 46, mirror 48 and photodetector array 50, the electrical quadrature phase signals P1 and P2 provide repeating amplitude patterns which are used to determine a coarse position for the data head 26 relative to the concentric data tracks of the data surface. E.g. four data tracks or more, may be defined by a single cycle of one of the phase signals P1 or P2. (See FIG. 11 and discussion thereof hereinafter.) An LED driver circuit 52 controls the light level put out by the light source 46, and a phase comparator 54 converts the optical phase signals into digital boundary signals which mark the boundaries of the data tracks DT.

A thermistor 56 is mounted to the base 16 in a manner enabling the thermistor 56 to be in thermal conduction with the base 16. Preferably, the thermistor 56 is mounted adjacent to the rotary actuator structure 28 so that it is in position to sense heat generated in the rotor coil 36. Preferably, the thermistor 56 is mounted to a flex circuit 123 which is attached by a screw directly to the base 16, adjacent to the bottom flux return plate of the magnet pair 38. The use of the thermistor 56 to control the seek profile characteristics of the disk drive 10 is discussed in commonly assigned, copending U.S. patent application Ser. No. 07/541,838, filed on Jun. 21, 1990, and entitled "Thermal Compensated Head Positioner Servo For Disk Drive", now U.S. Pat. No. 5,128,813, the disclosure thereof being incorporated herein by reference.

The data transducer heads 26 are connected to a read/write circuit 60 which also includes a data separator and an encoder/decoder for encoding and decoding a variable length, zero run length limited code. A peak detector amplifier 62 sequentially receives linear peak amplitude values read by the head 26 from the embedded servo sectors on the disk 18.

A microcontroller 64 forms the heart of the electronics 14. The microcontroller 64 operatively controls the spindle motor driver 24, the rotor driver 40, the LED driver 52, and an AGC DAC controlling read channel head amplitude of the read/write circuit 60. Analog values supplied by the photodetector array 50, the thermistor 56 and the peak detector amplifier 62 are delivered to a multiplexed analog to digital converter within the microcontroller 64. These analog values are converted into digital values under the control of a control program executed by the microcontroller 64. The rotary movements of the rotary actuator structure 28 and the light level put out by the light source 46 are controlled by pulse width modulator outputs of the microcontroller 64.

Other electrical elements of the disk drive electronics 14 include a data separator and memory controller circuit 66, an interface logic circuit 68, a read only memory 70 for containing external portions of the control program (certain time-sensitive portions thereof being contained within an on-board program memory of the microcontroller 64), a random access memory 72, and a cache buffer memory 74. A chip select logic circuit 76 enables the ROM 70 and RAM 72 to be selectively enabled under program control.

A data/low-bit address shared bus 78 interconnects the microcontroller 64, sequencer/controller 66, interface 68, ROM 70, and RAM 72. The sequencer/controller 66 decodes low order address values and provides them to the ROM 70, and RAM 72 over an external address bus 80. High order address values are provided by a bus 82 directly from the microcontroller 64 to the ROM 70, RAM 72 and chip select logic 76. Addresses for the data cached in the cache buffer 74 are generated and put out on a bus 84 from the sequencer/controller 66, and the data is transferred between the interface logic 68, cache 74 and sequencer/controller 66 over a shared bus 86. A bus 88 leads from the interface logic circuit 68 to a host computing system. The bus 88 typically carries address, data and control/status values in a predetermined small computer signalling format, such as SCSI, or AT.

A head position servo loop is formed by the optical encoder, data transducer head 26, read/write circuit 60, peak detector amplifier 62, microcontroller 64, rotor driver circuit 40 and rotary actuator structure 28 and scale 42. The optical encoder 41 including the scale 42 provides coarse position information to the loop, and the data transducer head 26, read/write circuit 60 and peak detector amplifier 62 provide fine position correction information to the loop.

The microcontroller 64 receives and digitizes the P1 and P2 analog position angle values from the optical encoder 41 and correction information from the data surface via the data transducer head 26, read/write circuit 60 and peak detector amplifier 62 as well as data storage or retrieval location information from the host computer via the interface logic 68. The microcontroller 64 thereupon converts the data storage/retrieval logical location information into physical location information and commands the driver 40 to operate the rotary actuator structure 28 in order to move the head 26 to the desired physical track location, or "cylinder" location. The appropriate data transducer head 26 is selected by head select circuitry within the read/write data separator and ENDEC circuitry 60, whereupon data may be read from or written to the track, under the control of the data sequencer/memory controller circuit 66. As described the drive 10 comprises an improvement and refinement of the disk drive described in the referenced U.S. patent application Ser. No. 07/192,353, filed May 10, 1988, now U.S. Pat. No. 5,005,089, the disclosure thereof being incorporated herein by reference.

Spindle Offset Correction

Figure 2:
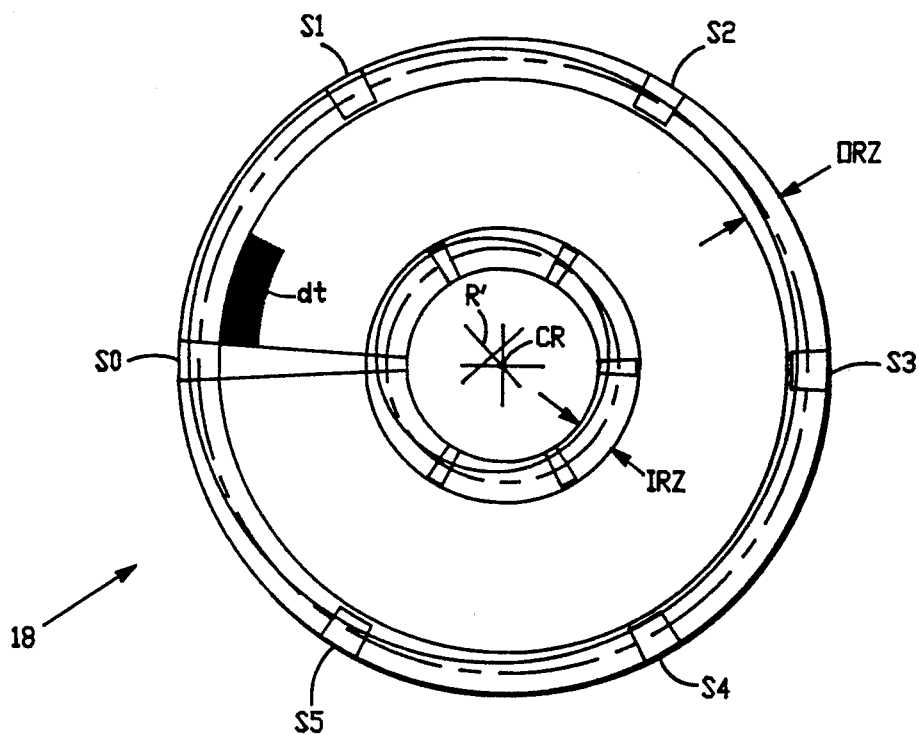
FIG. 2 is a somewhat diagrammatic plan view of a storage surface of a data storage disk of the FIG. 1 drive, including plural, prerecorded servo sector reference patterns in accordance with the principles of the present invention.
Figure 3:
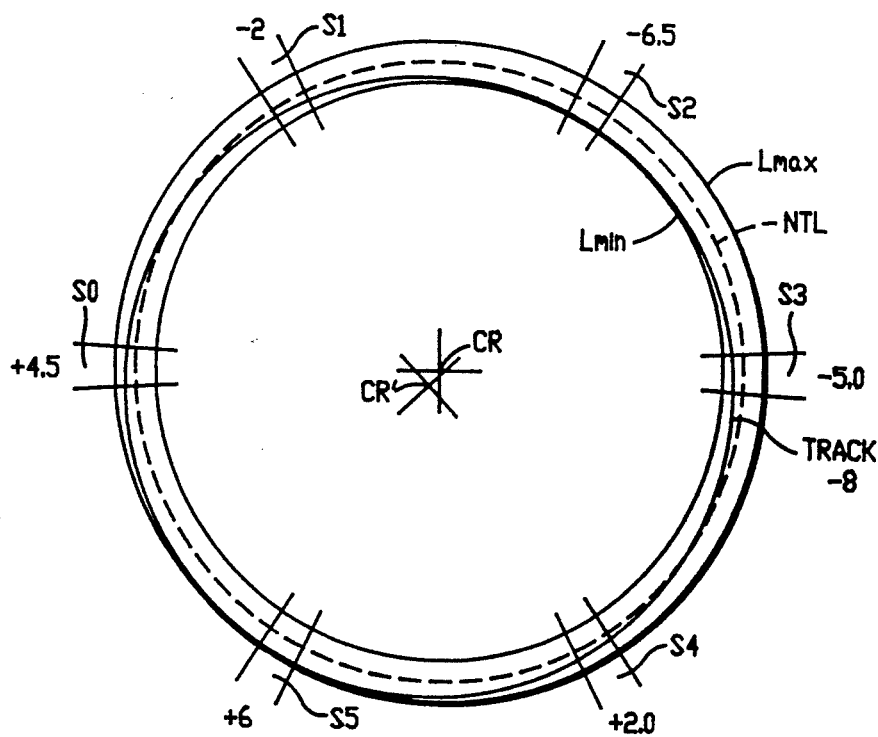
FIG. 3 is a more diagrammatic view of a tolerance zone for data track offset which is corrected by the present invention.
Figure 4:
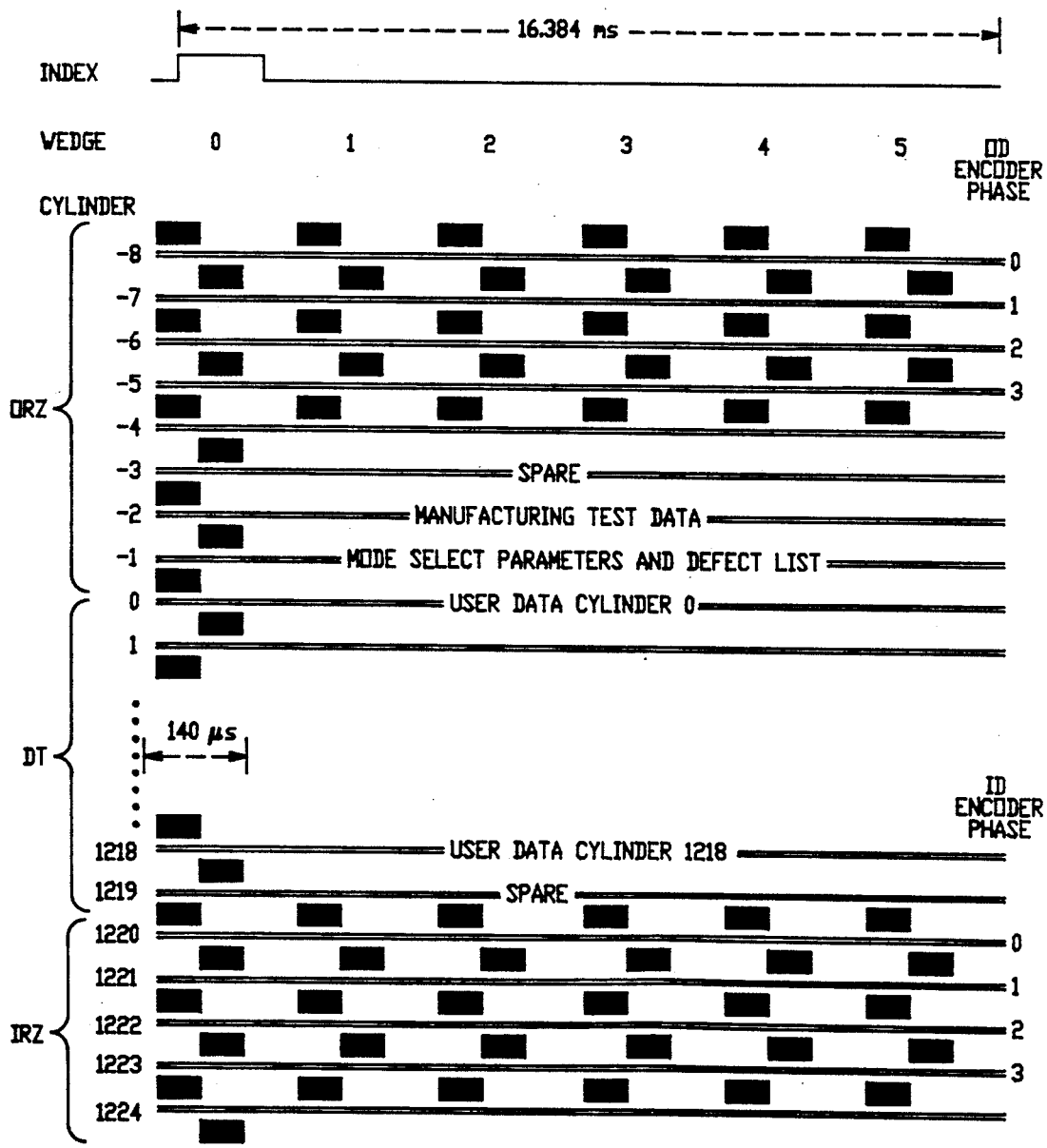
FIG. 4 is a linearized servo bursts format chart for the circular disk surface of the FIG. 2 disk.

The data storage surface of one of the data storage disks 18 is depicted in FIG. 2. The disk 18 may be used singly, or a plurality of disks may be provided, as desired in relation to total data storage capacity of the drive 10. Each disk 18 preferably has a nominal diameter of approximately 95 millimeters, or smaller. The storage surface includes an outer reference zone ORZ, an inner reference zone IRZ, and a multiplicity of concentric data tracks DT, such as 1219 concentric data tracks, lying between the outer zone ORZ and the inner zone IRZ. A nominal center of rotation CR is marked by vertical and horizontal cross lines, whereas an offset radius CR' is marked by cross lines which are angled with respect to horizontal and vertical. Six servo sectors S0, S1, S2, S3, S4 and S5 are provided in the outer reference zone ORZ and in the inner reference zone IRZ, as shown in FIGS. 2, 3 and 4. All of the servo sectors S0-S5 include radially offset, circumferentially staggered servo bursts as shown in FIG. 4 hereof, and as discussed in conjunction with FIG. 2 of the referenced U.S. Pat. No. 4,920,434, the disclosure of which is hereby incorporated by reference.

As best shown in FIG. 4, there are four tracks in the outer reference zone ORZ and there are four tracks in the inner reference zone IRZ; one pair of outer and inner tracks being defined by each optical phase of a polyphase optical position encoder 41, each complete optical cycle of one of the phases P1 or P2 defining four adjacent data track locations in repeating fashion across the extent of the data storage surface. Track −8 of the outer reference zone and track 1220 of the inner reference zone correspond to encoder phase 0; track −7 of the outer zone and track 1221 of the inner zone correspond to encoder phase 1; track −6 of the outer zone, and track 1222 of the inner zone correspond to encoder phase 2; and, track −5 of the outer zone, and track 1223 of the inner zone correspond to encoder phase 3.

With reference to FIG. 3, in the event that a spindle offset R' develops, a reference track, e.g. track −8, manifests an eccentricity with respect to a nominal track locus NTL designated by the dashed circular line. The maxima and minima of the offset define two concentric loci Lmax and Lmin which define the width of an annulus surrounding the nominal track locus NTL.

In accordance with the principles of the present invention, the A/B servo bursts for the sectors S0, S1, S2, S3, S4 and S5 are read and recorded in memory. The signed offsets are then averaged, to develop an average radius for the offset, and the average radius is then adopted as the locus of the reference track, such as track −8. This average locus is then used as the corrected location of the reference track. A similar measurement and correction is made to the same-optical-phase, corresponding inner zone reference track, such as track 1220. Then, a slope value is calculated and stored with the offset correction values for the outer reference track, as was done in the referenced U.S. patent application Ser. No. 07/192,353, filed on May 10, 1988, now U.S. Pat. No. 5,005,089.

Optical Encoder 41

Figure 5:
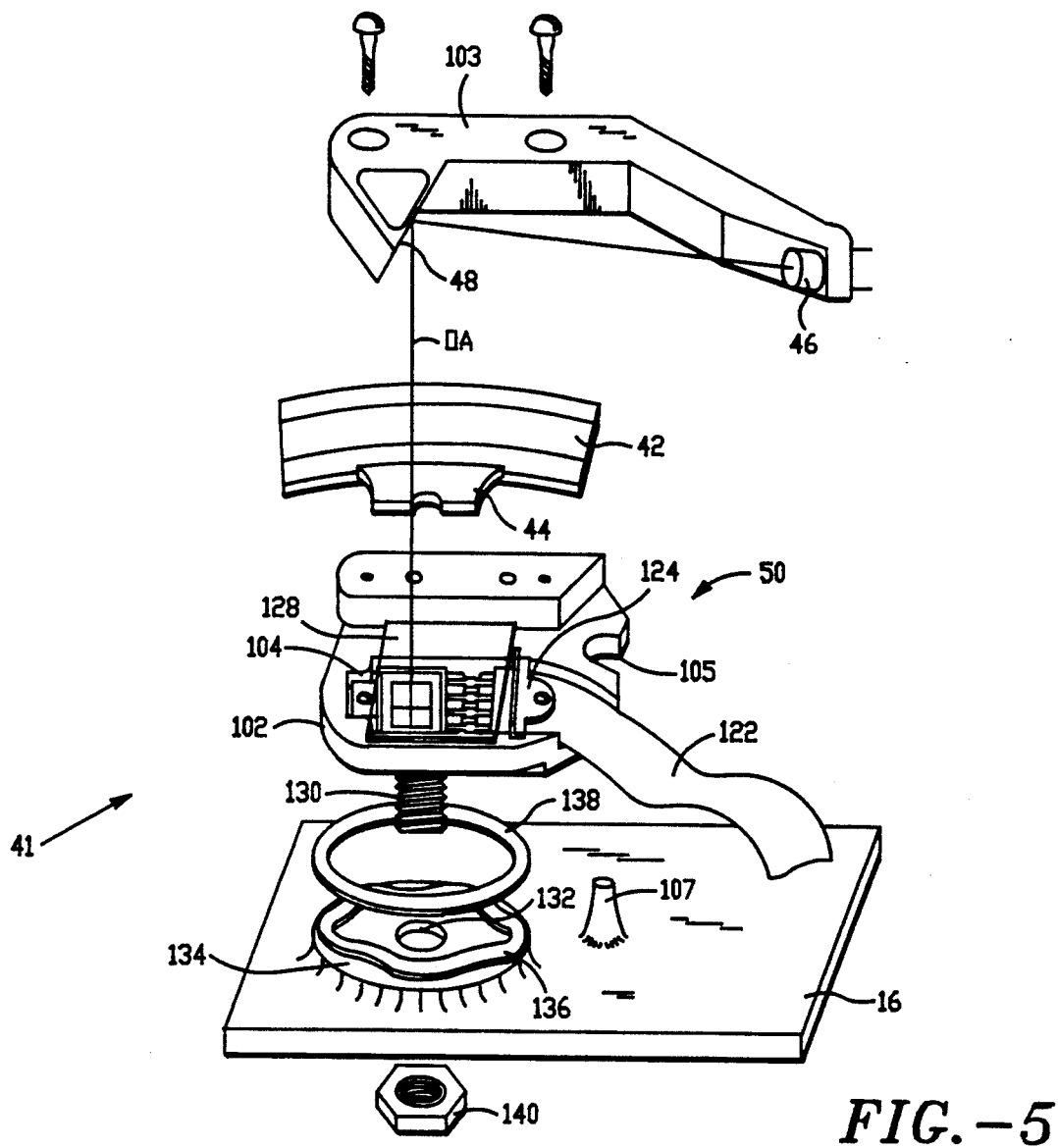
FIG. 5 is an exploded view of an optical encoder assembly incorporated within the FIG. 1 disk drive.

With reference to FIG. 5 the polyphase optical position encoder 41 is formed on a molded plastic base 102 to which an arm structure 103 for supporting the LED and the mirror 48 is mounted by two screws which pass through openings in the arm structure 103 and self-thread into aligned openings of the base 102.

Figure 7:
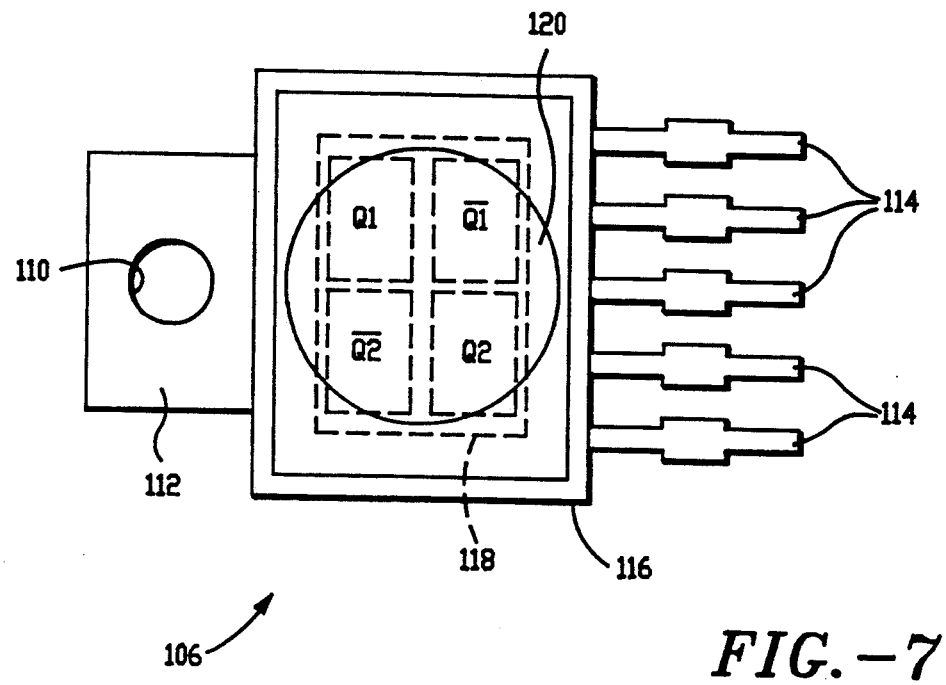
FIG. 7 is a plan view of an integrated circuit package for the photodetector array of the FIG. 5 optical encoder.

The base 102 defines a well 104 in which an integrated circuit photodetector array 106 FIG. 7) is mounted. A pin 108 projects upwardly within the well 104 and registers with a hole 110 formed in a tab 112 extending from the photodetector array 106. The base 102 also defines a curved recess region 105 which limits rotation of the base 102 relative to the base casting 16 to a few degrees of rotation for adjustment about an optical axis OA of the reticle, shown in FIG. 8. A boss 107 extending upward from the floor of the base casting 16 is engaged by the base 102 on each side of the recess region 105 at each limit of rotation.

Turning now to FIG. 7, five pins 114 extend outwardly from a molded body 116 of the integrated circuit array 106 thereby providing an electrical connection for each of the four photocells Q1, BAR Q1, Q2 and BAR Q2 formed on a common integrated circuit substrate 118. Since there is no requirement for an AGC cell within the photodetector array 118, virtually the entirety of the substrate 118 is devoted to the four cells Q1, BAR Q1, Q2 and BAR Q2, thereby increasing the area for reception of light photons from the LED 46. A transparent window 120 is formed in the molded body 116 of a plastic material having a suitable index of refraction to maximize transmission of light to the four photocell areas.

Returning to FIG. 5, the base 102 also positions and supports a flexible mylar circuit extension 122 carring conductive traces leading to the pins 114 of the optical encoder integrated circuit 106. The extension 122 extends from a flexible printed circuit 123 formed on a plastic substrate, such as Mylar film. The printed circuit 123 is shown in FIG. 10 and it contains the circuitry depicted electrically in the FIG. 9 schematic circuit diagram of the optical encoder circuitry.

Figure 6:
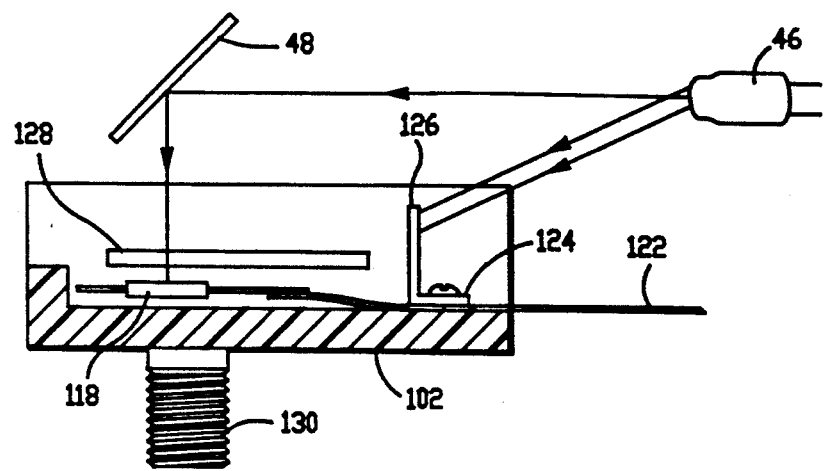
FIG. 6 is a somewhat diagrammatic view in elevation of the FIG. 5 optical encoder assembly showing a light shield for shielding the reticle of the FIG. 5 encoder from edge lighting by the LED and consequent light scattering within the reticle.

The pins 114 are soldered to solder pads at the ends of the traces formed along a common edge facing the pins 114. A clamp 124 clamps the mylar circuit 122 to the base 102. As shown in FIG. 6, a tab wall portion 126 extending upwardly from the clamp 124 acts as an edge lighting shield, preventing edge illumination and light scattering within a glass reticle 128 secured to the base 102 over the well 104 and in registration with the optical encoder integrated circuit 106. Prevention of light scattering within the reticle 128 thereby prevents scattered light photons from reaching the photodetector cell array and resulting in a higher electrical noise or background signal.

The base 102 includes a threaded mounting stud 130 which extends through a hole 132 defined through the floor of the drive base casting 16. A raised annular plateau region 134 of the base casting is engaged by a wavey washer 136. The wavey washer 136 is sized and aligned to lie compressibly between the plateau region and a flat washer 138 which bears against an underside of the molded plastic base 102 of the encoder 41.

After assembly the encoder 41 is installed in the drive by positioning the stud 130 through the hole 132 and installing a nut 140 over the threads of the stud. The nut 140 is then tightened until the encoder base 102 positions the reticle 128 at the desired height relative to the scale 42. At this height, the wavey washer 136 becomes compressed and biases the base away from the floor of the base casting 16. The base 102 and arm assembly 103 are then rotated within the limited range of angular rotation to adjust the phase lead-lag trim of the optical encoder phases. After this adjustment is completed, an adhesive is injected through a small transverse notch at the threads of the nut 140 to glue the encoder 41 in place. The optical encoder 41 thus constitutes a refinement and improvement upon the optical encoder structure described in the referenced U.S. Pat. No. 4,703,176, the disclosure of which is incorporated herein at this portion of the specification.

As noted hereinabove, one object of the present invention is to make use of a differential amplification of Q1 and BAR Q1 cell signals, and a differential amplification of Q2 and BAR Q2 cell signals, as was done in the case of the disk drive described in the referenced U.S. Pat. No. 4,396,959 and its progeny of commonly assigned patents. However, in that disk drive, the cells were arranged and connected differently: their electrical outputs were differenced diagonally with regard to the optical axis OA (e.g. Q1 was located in an upper left quadrant and BAR Q1 was located in a lower right quadrant, etc.).

In the present disk drive 10 it was discovered that the collimation of the light energy put out by the LED 46 was not uniform across the diagonal dimension with reference to the optical axis OA. This lack of uniformity of light collimation caused an uncorrectable shift away from the desired 180 degrees of optical phase difference between Q1 and BAR Q1 (and also between Q2 and BAR Q2). (The phase relation between Q1 and Q2 and between BAR Q1 and BAR Q2) is 90 degrees, thereby providing the desired quadrature relationship). Thus, a side by side arrangement of cells has been adopted.

Figure 8:
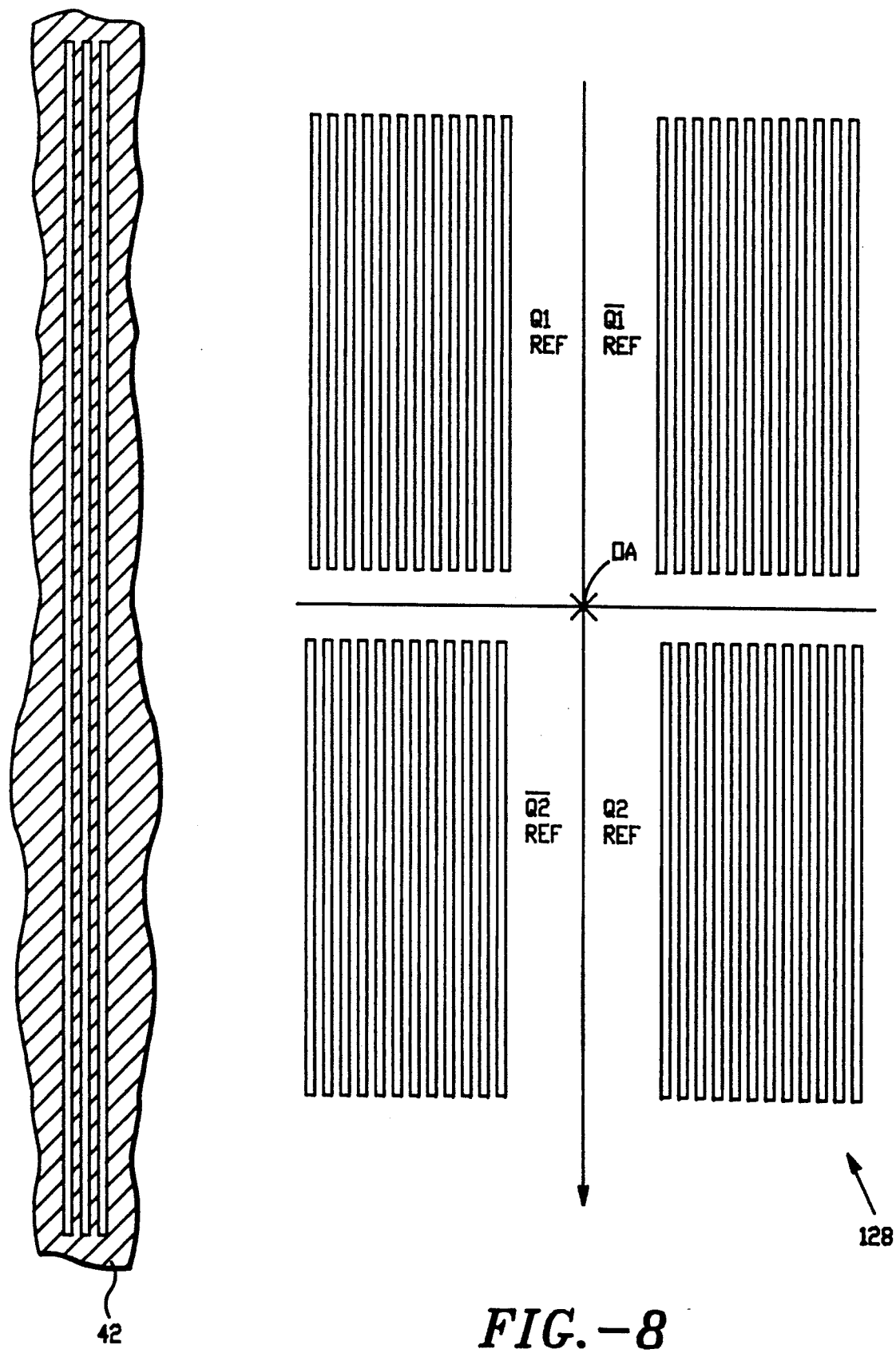
FIG. 8 is a greatly enlarged plan view of the reticle window patterns in relation to the scale radial microlined pattern of openings and opaque regions.

With reference to FIG. 8, it is to be noted that there are four sets of radial openings RO defined by the reticle 128 for each of the photodetectors Q1, BAR Q1, Q2 and BAR Q2. The twelve openings of these four sets are made very narrow with respect to their radial length. These light openings are sometimes referred to as "microlines", however, rather than being opaque, they are light-transmissive. Also, the transparent openings of the scale 42 (also referred to as "microlines") are made very narrow relative to their radial length. For example, the pitch of each scale opening is 0.07920045 degrees and the width of each scale opening is one half of the pitch thereof. The pitch of each radial opening of each of the four sets of the reticle is two fifths of the scale pitch. The upper set of reticle openings (for Q1 and BAR Q1) have a radial length of 0.1622 mm, while the lower set of reticle openings (for Q2 and BAR Q2) have a radial length of 1.71 mm, making the openings of the reticle 128 very long along the radius of rotation as compared to transverse width of each opening along the locus of rotation, as shown in FIG. 8. The radius from the axis of rotation of the rotary actuator to the optical axis OA of the encoder assembly 41 in this example is 42.685 mm. With the arrangement as shown in FIG. 8 and as described herein, phase lead/lag trim is still available by a rotation adjustment of the base 102 and reticle 128 about the optical axis OA relative to the radially fixed scale 42, incident to installation of the optical encoder assembly 41 within the head and disk assembly 12.

Figure 9:
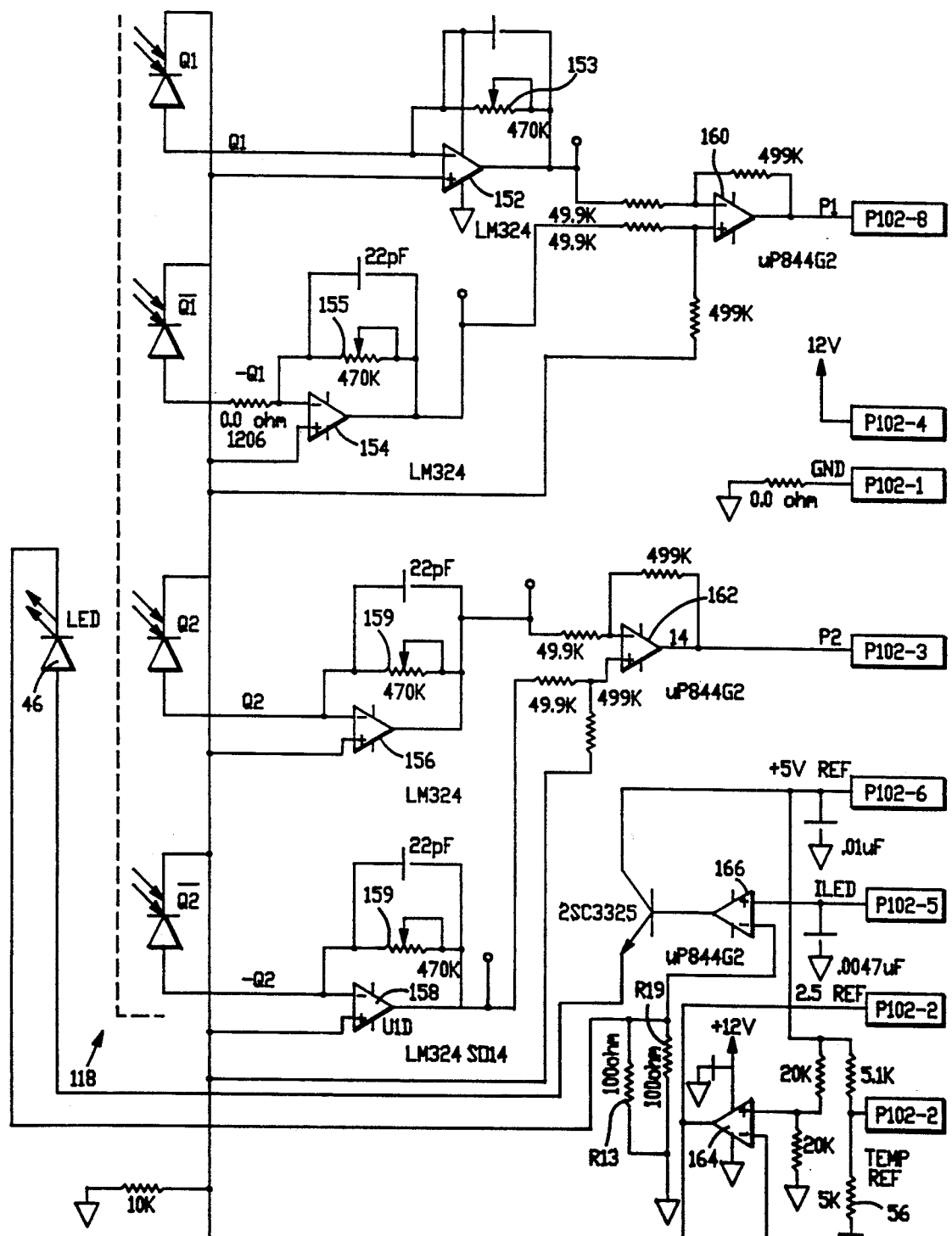
FIG. 9 is an electrical circuit schematic diagram of the optical encoder circuit of the FIG. 5 optical encoder.
Figure 10:
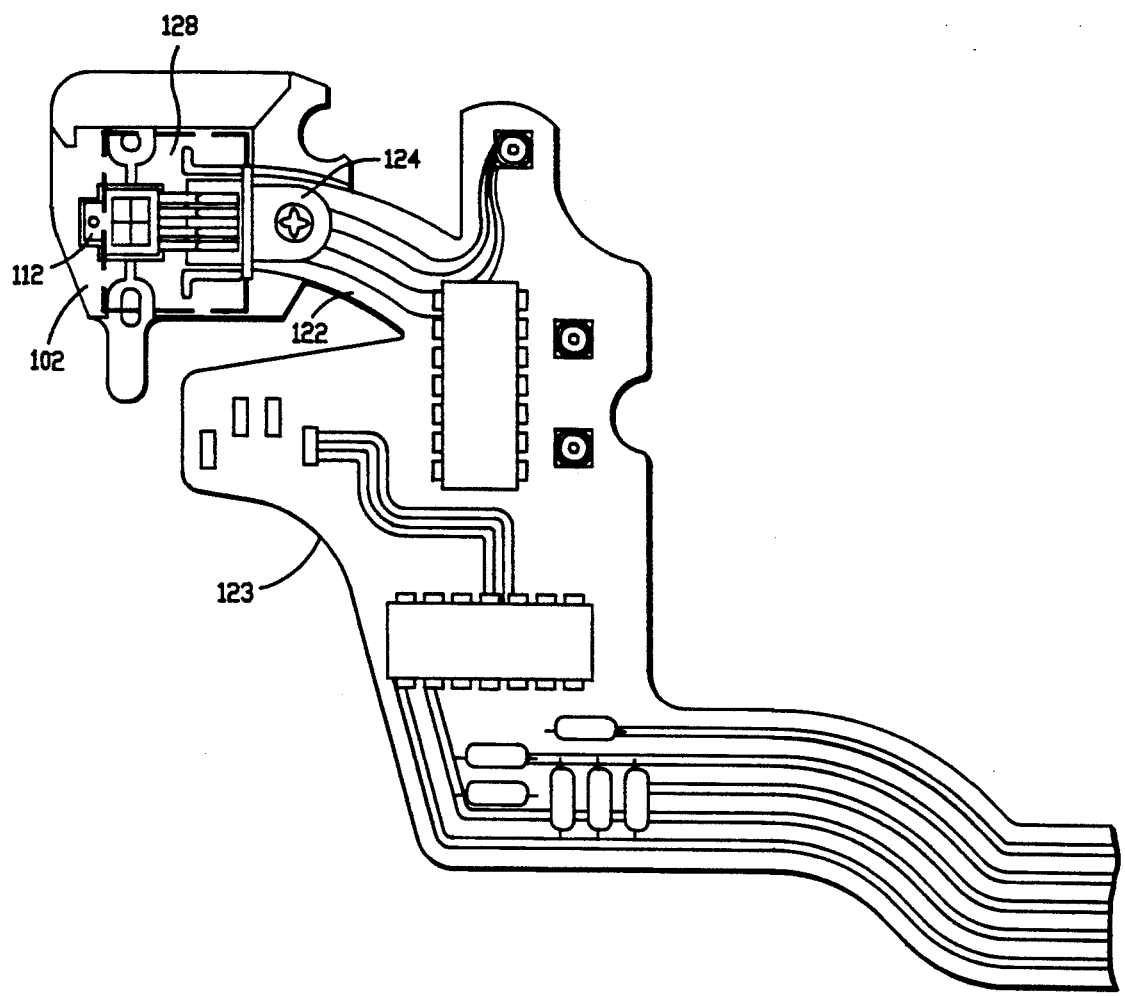
FIG. 10 is a plan view of the FIG. 5 optical encoder with the arm removed and showing a flexible mylar printed circuit substrate containing the FIG. 9 circuitry.

Optical Encoder Circuitry, FIG. 9

An optical encoder circuit 150, depicted in the FIG. 9 electrical circuit schematic, converts electrical currents received from the four photodetector cells Q1, BAR Q1, Q2 and BAR Q2 into two differential voltages P1 and P2 which are in electrical quadrature relationship.

Current from the Q1 cell enters a first current-to-voltage operational amplifier 152, while current from the BAR Q1 cell enters a second current-to-voltage operational amplifier 154. Current from the Q2 cell enters a third current-to-voltage amplifier 156, and current from the BAR Q2 cell enters a fourth current-to-voltage amplifier 158. The amplifiers 152, 154, 156 and 158 are formed as a single integrated circuit so as to have closely matched electrical characteristics. Trim potentiometers 153, 155, 157 and 159 enable the gains of the amplifiers 152, 154, 156 and 158 respectively to be adjusted at the factory. These potentiometers 153, 155, 157 and 159 provide for compensation for the circumstance that light amplitude may not be uniform at each photocell, since the LED 46 is purposely some distance away from the photodetector array 118.

Voltage outputs from the amplifiers 152 and 154 are differenced in a high slew rate differential amplifier 160 in order to produce the P1 differential phase signal, and voltage outputs from the amplifiers 156 and 158 are differenced in a high slew rate differential amplifier 162 to produce the P2 differential phase signal. By employing differential amplification to derive the phase signals P1 and P2, improved common mode rejection and increased signal to noise ratios lead to improved noise immunity.

An amplifier 164 develops a 2.5 volt reference voltage from a +12 volt power supply bus and supplies the reference voltage to the photodetector substrate 118 and to the reference inputs of the four cell amplifiers 152, 154, 156 and 158. The precise 2.5 volt reference voltage is also supplied to the microcontroller 64 for use as a reference by the analog to digital converter 331.

Returning to FIG. 1, the LED driver circuit 52 includes an emitter follower buffer transistor connected to the PWM output 332 of the microcontroller 64. The buffer transistor (not shown) provides a suitable driving current for the variable duty cycle pulses put out by the PWM 332. A resistor-capacitor low pass network (not shown) connected to the emitter of the buffer transistor converts the pulses into an analog driving level. Turning again to FIG. 9, a transconductance amplifier 166 receives the LED driving level from the low pass filter and puts out a current to drive the LED 46 to a controlled level. The amplifiers 160, 162, 164 and 166 are formed as a single integrated circuit so that the characteristics thereof are highly matched, which is particularly significant in the case of the differential amplifiers 160 and 162.

The electrical circuit elements shown on FIG. 9 are formed and connected on a small flexible mylar printed circuit substrate 123 which is contained within the head and disk assembly 12. The temperature sensor thermistor 56 is also contained on the substrate 123. The entire subassembly including the base 102, arm 103 and mylar circuit board 123 of FIGS. 9 and 10 may be adjusted independently before installation into the drive 10. For example, the potentiometers 153, 155, 157 and 159 are so positioned as to be adjustable by a robot at a test station. In this regard, the test station applies a 20 milliampere LED command value to the transconductance amplifier 166. The voltage developed at the output of each cell amplifier 152, 154, 156 and 158 is then measured and set to e.g. minus 500 millivolts, which represents a nominal desired gap dimension.

Initial Calibration

Initially, the microcontroller 64 directs the motor controller/driver 24 to start the spindle motor approximately 700 ms after power is first applied to the drive 10. After a second or so, the actuator 28 is powered to move the data head 26 to an inner crash stop at an inner landing zone. The cache buffer memory 74 is tested, and an initial optical encoder test is performed.

While the head 26 is positioned at the landing zone, the PWM 332 commands the LED driver 52 to turn off the LED. With no light present at the photodetector array, the dark current voltages of the array are approximately equal. Because the outputs of the cells Q1 and BAR Q1 (and the cells Q2 and BAR Q2) are differenced by the differential amplifiers 160 and 162, the nominal P1 and P2 position voltage values should closely approach the 2.5 volt reference. This is depicted in the FIG. 11 encoder circle graph as a dark spot DS, located approximately midrange within the dynamic quantization range which in this example is +5 volts. If these "dark current" values are not within ±15% of 2.5 volts, an ANALOG P1 or P2 IS BAD fatal error message is sent to the host. These P1 and P2 values are also used as temporary circle center values, until the actual centers are found in the later initialization states.

In order to prepare the drive 10 for microstepping, a safe small circle radius size is passed to the circle adjust routine. This minimum radius value is predetermined within the design of the drive and is graphed in the FIG. 11 encoder circle graph as the smaller radius circle MNR centered over the dark spot center DS. The microcontroller 64 commands the PWM 332 to step the LED current out to a predetermined value which should result in the minimum circle servo radius value MNR. Once an encoder circle minimum radius value MRZ is established by controlled light output from the LED 46, the current actuator position angle is read, and a seek is attempted outwardly by one track pitch of 128 positional increments (90 degrees along the circle, as shown in FIG. 11).

Figure 11:
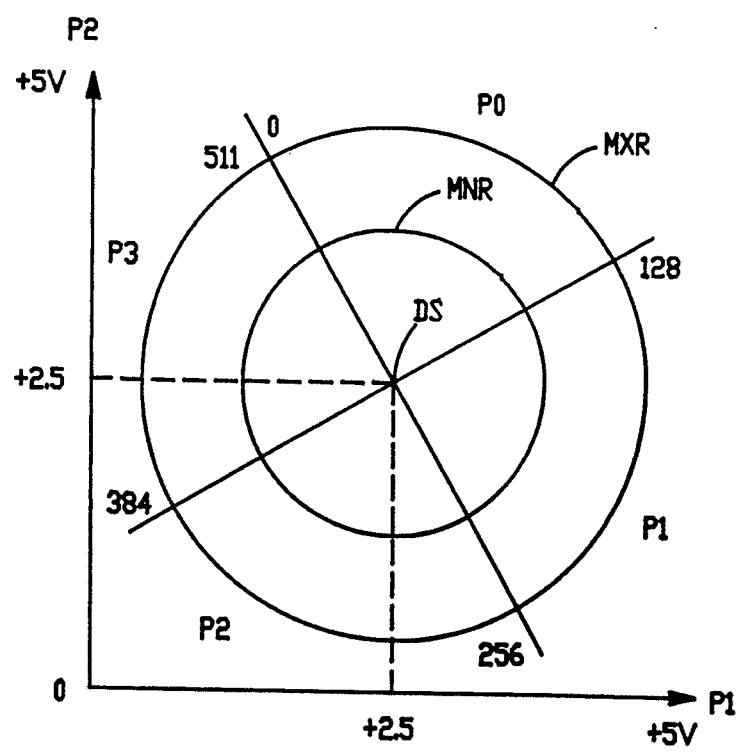
FIG. 11 is a diagram of an encoder circle locus followed by P1 and P2 phase quadrature signals and used in order to determine incremental head position within four adjacent tracks, each track being associated with an optical phase or quadrant of the circle.

It should be noted that FIG. 11 depicts the encoder circle as being aligned generally at an angle with respect to the P1 and P2 coordinates. This arrangement is presented to show clearly the four quadrants of the circle which provide the P0, P1, P2 and P3 optical phases which identify four adjacent cylinder locations in repeating fashion as the circle is traversed. An angle offset situation obtains whenever actual track position, as established from the prerecorded servo bursts, differs from optical phase information provided by the polyphase encoder 41. The effect of the centerline offset information derived from the A/B servo bursts is to shift the track phases by the amount of the offset around the encoder circle. Nominally, the axes dividing the phases P0, P1, P2 and P3 are respectively parallel and perpendicular with the P1 and P2 axes shown in FIG. 11.

To determine if the aerodynamic shipping latch has released the actuator by virtue of airflow caused by disk rotation, the microcontroller 64 microsteps the actuator 28 toward the center of the data track area of the disk in e.g. 60 track seek increments, the microsteps being based upon commanded angle values. At the same time the P1/P2 encoder actual position angle along the circle is monitored. If the microstep-to-center routine finds that a difference between angle reference and actual angle exceeds 128 increments (one track), a retry "jiggle" code is invoked. This code causes the actuator 28 to step back and forth between the inner crashstop and the obstacle for a maximum of 32 tries. If after this attempt the latch has not cleared, a fatal AIRLOCK STUCK CLOSED message is posted to the host and the servo is turned off. If the "jiggle" operation is successful, the actuator is positioned at mid-stroke around cylinder 600. Phase zero angle reference is stored in order better to predict the ID angle to settle to during an initial prediction update routine.

Before activating a fast seek mode, the track crossing counters which are responsive to the phase comparator 54 are verified. First, the microcontroller 64 commands a 1.5 track microstep operation and monitors the sum of the two track crossing counters to be sure that they have become incremented. Next, the microstep routine causes a progressive stepping around the encoder phase circle for 512 incremental angle positions (four tracks) and verifies that each counter has recorded two track crossings.

A circle center offset test is then performed. During this test, the actuator 28 is stepped around the encoder circle (four tracks) in quarter track increments, while the P1 and P2 analog values are read. The highest and the lowest values of each are determined, recorded in memory, and used to calculate the center of the encoder circle, in accordance with the following:

Center $(P1) = (P1\ min + P1\ max)/2$

Center $(P2) = (P2\ min + P2\ max)/2$

After both P1 and P2 center values are calculated, their offsets are found from an ideal center at the reference 2.5 volts. The larger of the two measured offsets is the subtracted from a design-established initial maximum allowed radius in order to prevent the encoder circle becoming non-symmetrical due to clipping near ground potential or above the 5 volt a/d reference voltage. This radius size will then be used subsequently in the calibration process to adjust maximum circle size.

Using default read channel AGC settings, an attempt is made to read the A and B burst amplitudes of the track being followed. Read channel gain is increased by the microcontroller 64 until burst amplitudes are above minimum amplitude limits. After the amplitude is adjusted, an attempt is made to equalize the bursts so as to position the head 26 in alignment with a nominal track centerline of the track being followed. Once the head 26 is on-track, an attempt is made to read a track and sector address. If an initial attempt is unsuccessful, the microcontroller 64 commands the read channel to cycle through the data rates for all of the data zones of the disk (there being three data zones, each having its own data rate which is selected in relation to storage disk radius and relative velocity between the head 26 and the disk 18. In this example, tracks 0 through 453 are in an outer zone and include 49 data sectors; tracks 454 to 835 are in a middle zone and each track has 42 sectors; and, tracks 836 to 1218 are in an inner zone and each track has 35 data sectors.) If the attempt to read the track and sector address of the track being followed is successful, absolute head position on the data surface is thereby established, the track counters are appropriately written, and a seek is made by the fast seek routine to a system cylinder located at track −2 at the outer region ORZ.

If the attempt to read the track and sector address is unsuccessful, the actuator 28 is microstepped to the outer radial zone ORZ until an outer crash stop is reached. Then, the actuator 28 is microstepped 20 tracks inwardly of the outer crash stop and settled. A search is made for the A burst. After the A burst is found, microstepping continues until the B burst equals the A burst. At this point, the actuator 28 is positioned at track −8 which is the first servowritten track (FIG. 4). If no bursts are detected during the search for the A burst, the actuator 28 is settled at 34 or 36 tracks from the outer crash stop at an angle position of 0 or 256, and that position becomes track zero. In this case no further encoder calibration is performed and there is no further drive initialization to be carried out.

Assuming that the track and sector address was read and that head position relative to the data tracks was thereby established and that the head is now settled over cylinder −2, the track and sector information is read and drive configuration and media defect information is loaded into predetermined register locations within the microcontroller 64 and the RAM 72.

A prediction initization calibration operation begins at cylinder −8. First, the current NULLI value is stored in a memory location as OD_NULLI. As noted above in connection with the discussion of FIGS. 2-4, the bursts of the six sectors are equalized by an averaging process to determine a nominal average centerline locus for the track. After equalizing the bursts, the position angle is saved as the optical encoder phase 0 angle reference. Then, read channel AGC DAC values are calculated and stored for all data transducer heads 26 as described in the referenced and incorporated U.S. Pat. No. 5,005,089. Both steps are repeated for the remaining three outer reference zone optical phases of the encoder circle.

If the amplitude on any given head cannot be adjusted to a desired value, a fatal BAD HEAD AMPLIFIER error is posted to the host and the servo loop is turned off. Also, if the A/B servo bursts cannot be made equal after retrying for 30 revolutions, a fatal A/B SERVOS NOT EQUAL error is posted to the host and the servo is turned off.

If all head initialization procedures are within nominal, circle radius of the optical encoder 41 is calculated for each phase and saved for later use within a circle size adjustment subroutine.

Next, a seek to the inner reference zone IRZ is made using the predicted SEEK NULLI and the initially obtained midstroke angle reference value. NULLI slope is then computed using the current value and the one stored for the outer reference cylinder for the same optical phase. Read channel AGC DAC values are then computed for each head and slopes are calculated using the OD read channel AGC DAC values. After equalizing the bursts from the six sectors, the inner reference zone angle is determined, and the angle correction slope is calculated. This procedure is repeated for the three other phases of the optical encoder for which there are servo tracks at the ORZ and IRZ.

At the same time encoder circle radius for the four phases while the head is at the inner zone IRZ is calculated, and recorded. The radius values for the four IRZ phases are compared with the radius values for the four ORZ phases in order to determine the phase having the larges radius. Once the largest radius is determined, the microcontroller 64 commands the PWM 332 to adjust the LED light output level to produce a predetermined maximum circle size on that phase (as corrected for any center offset errors previously meaured). A flag is set in memory to identify the phase and zone having the initial largest circle size so that during future recalibration updates, a check is made at that phase and zone.

As already noted, changes in the dimension of the gap between the scale 42 and the reticle 128 have the effect of increasing or decreasing the P1 and P2 light amplitude differential levels with consequential change in the diameter of the lissajous circle resulting from the P1 and P2 optical phase signals. Ideally one desires a circle lissajous having a greatest useable diameter without distortion, thereby to take advantage of the full dynamic range of the analog to digital converter 331 of the digital microcontroller 64 which converts the P1 and P2 analog values into digital values. In practice, the greater the diameter, the greater the positional resolution of the resultant quantized digital position values. This is the reason that the maximum safe radius of the encoder circle is determined during the initial calibration routines. Also, during these routines, the determination of the greatest radius at either the outer reference zone ORZ or inner reference zone IRZ has the effect of determining any change in gap occurring along the stroke of the scale 42 relative to the reticle 128.

In making the determination of the radius of the encoder circle the P1 and P2 values are processed as right angle coordinate values in an abscissa/ordinate system in accordance with the Pythagorean Theorem. In order to obtain the radius (hypotenuse) of the encoder circle, the P1 and P2 values are squared and summed, and the result is then compared with a prestored maximum radius value squared in order to determine the maximum safe radius of the encoder circle.

Thermal Update Recalibration

After power-on initialization of the drive 10, angle reference and on-track NULLI values are adjusted during intermittantly occurring prediction updates in order to compensate for thermal mechanical expansion, electrical component drifts, and other changes. Also, read channel AGC DAC values are recalibrated to compensate for any drifts in the read channel electronics. The update is performed whenever e.g. two degrees of temperature change is sensed by the thermistor 56; or, if the temperature has stabilized, after 20 seconds initially, and after subsequent time intervals with each interval being increased by a factor of 1.5 until the interval reaches a maximum duration of 30 minutes.

Thermal recalibration starts at the reference cylinder for optical phase zero at the outer reference zone. A new OD NULLI value is stored, and then the servo thermal variables are updated. Then, for each data surface and data head, all six A/B servos S0-S5 are read and servo bursts amplitudes are stored. Each burst's angle error from the last update is calculated, and then all errors are averaged with sign to yield a new outer reference cylinder locus. Read channel AGC recalibration is also performed to adjust the gain of each head, if readjustment is needed. The angle and the AGC calculation is repeated for the remaining three outer reference zone optical phases.

Next, a seek to the inner referenze zone IRZ is made and the head stack is positioned at the cylinder for optical phase zero. NULLI and angle reference calculations are made for the four inner reference optical phases. New NULLI slopes and angle reference slopes are computed using the new outer and inner reference zone values and are then stored in a table, so that an angle reference and an on-track NULLI for any data track cylinder may be easily interpolated.

The calibration process is broken up into eight independent states, one for each calibration phase. This allows the drive 10 to be ready to accept host commands upon completion of each state, not to exceed 120 milliseconds. If calibration is interrupted by responding to a host command, the drive 10 will complete the calibration routine after command execution is completed.

During each update, new P1 and P2 center values are calculated and used for computing the maximum circle radius. According to the phase and zone flag set during initialization, circle size is measured and readjusted if necessary to the maximum safe radius at the flagged phase and zone. During update recalibration, the radius is recomputed and encoder LED current is incremented/decremented to compensate for shrinking or growing encoder circle diameter. Thus, a closed loop control of the encoder LED intensity allows the drive 10 to function properly even when the LED loses its original intensity, due to long term ageing of the LED cell. The equation relating the setting of the PWM 331 output and the resulting LED output current is as follows:

$$Io = \{[(PWM/256)*Va/d\ ref] - Vbe\}/Rsense,$$

where
Io = LED current
PWM = output value of the PWM 331
Va/d ref + 5 volt A/D microcontroller ref. voltage
Vbe = the base to emitter drop of the buffer transistor, and
Rsense = parallel resistance of R13, R19 (50 ohms in the FIG. 9 example).

To those skilled in the art, many changes and widely varying embodiments will be suggested from the foregoing. The disclosures and descriptions herein are presented by way of illustration only, and should not be construed as limiting the the present invention, the scope of which being more particularly pointed out and set forth in the following claims.

What is claimed is:

1. A method for calibrating head position of a data transducer head in a disk drive including a disk drive base, a data storage disk rotating relative to the base and having a data surface defining a multiplicity of concentric track locations, the data transducer head for writing data to and reading data from selected tracks at the locations thereof, an actuator structure moveably mounted to the base for limited displacement for positioning the data transducer head at the selected track, a polyphase optical encoder coupled between the actuator structure and the base for generating P1 and P2 electrical phase signals by which a plurality of adjacent ones of the said data track locations are defined over a complete cycle of one of the phase signals, and head position correction information prerecorded in at least one reference track, the method including the steps of:

calibrating the polyphase optical encoder by measuring P1 and P2 values when a light source of the optical encoder is operating without any light being emitted by a light source thereof in order to obtain a center spot of an encoder circle, commanding the light source to put out a minimum useable light level with reference to the center spot, moving the actuator structure to position the head over a reference track by reference to P1 and P2 encoder values resulting from the minimum useable light level, reading the prerecorded head position correction information from the reference track with the data transducer head, calculating a head position correction value from the head position correction information and applying the value to correct P1 and P2 encoder values in order to position the data transducer head in alignment with track centerline of the reference track, moving the data transducer head over a complete optical cycle defining the plurality of track positions and recording a circle radius for each track location, determining which track has the largest circle radius, and commanding the light source to put out a maximum light level with respect to the track determined to have the largest circle radius.

2. The calibration method set forth in claim 1 wherein the reference track includes a plurality of correction values recorded in sectors spaced about the circumference of the reference track, and wherein the step of reading the prerecorded head position correction information from the reference track with the data transducer head includes the steps of reading and recording each correction value as a signed value, summing the recorded signed correction values to produce a sum and dividing the sum by the number of values read and recorded to produce a reference centerline locus for the reference track.

3. The calibration method set forth in claim 1 wherein there is at least one reference track for each phase of the optical cycle defining plural adjacent track locations, and comprising the further step of reading the prerecorded head position correction information from each reference track.

4. The calibration method set forth in claim 1 wherein the P1 and P2 phase signals are in electrical quadrature and wherein four adjacent track locations are defined by a complete cycle of an optical phase, and wherein there is at least one reference track for each phase of the optical cycle, the method comprising the further steps of reading the prerecorded head position correction information from each reference track to provide a correction value for each phase of the optical cycle and calculating a correction value for a said track location to be followed by the data transducer head by reference to a said phase of the optical cycle corresponding to the said track location.

5. The calibration method set forth in claim 4 wherein there are two reference tracks for each phase of the optical cycle and the step of calculating a correction value for a said track location to be followed by the data transducer head comprises the step of calculating the correction value from the position correction information read from the said two tracks.

6. The calibration method set forth in claim 5 wherein one of said two reference tracks is located in a radially outermost track location region, and another of said two reference tracks is located in a radially innermost track location region.

7. In a disk drive including a base, a data storage disk rotating relative to the base and having a data surface defining a multiplicity of concentric data track locations, a data transducer head for writing data to and reading data from data tracks at selected ones of the data track locations, an actuator structure moveably mounted to the base for limited displacement for positioning the data transducer head at the selected ones, and polyphase optical encoder means coupled between the actuator structure and the base for generating P1 and P2 phase signals by which the data track locations are nominally defined, the improvement comprising:

a plurality of circumferentially spaced apart servo sector means defined in at least one servo track location, each said servo sector means including prerecorded track centerline information readable by the data transducer head, head position controller means responsive to the P1 and P2 phase signals for executing a calibration routine by causing the actuator structure to move the data transducer head to the servo track location, sample means associated with the data transducer head for sequentially sampling the track centerline information of each said servo sector means to produce a head position sample therefrom, accumulation means for accumulating the head position samples from the servo track location, deriving means for averaging the head position samples to provide an average centerline position value, processing means associated with the head position controller means for processing the averaged centerline position value to provide a corrected nominal track location value derived from the P1 and P2 phase signals and to apply the corrected value to the head position controller means.

8. The disk drive set forth in claim 7 wherein the actuator structure comprises a mass balanced rotary actuator means journalled to the base for limited rotational displacement and wherein the polyphase optical encoder means is closely coupled between a rotary actuator portion of the rotary actuator means and the base.

9. The disk drive set forth in claim 7, wherein the P1 and P2 phase signals are in electrical quadrature and are derived from plural optical phases of the optical encoder means, and further comprising a plurality of servo track locations within a contiguous region of the data storage surface wherein each said servo track location is associated with a said optical phase and further wherein the head position controller means causes the actuator structure successively to position the head over the plurality of servo track locations during the calibration interval, the sample means for sequentially sampling the head position samples from each said servo track location, the accumulation means for separately accumulating the samples from each said servo track location, the deriving means for separately processing the head position samples of each said servo track location into a derived centerline position value for each said servo track location, and wherein the processing means processes a said derived centerline position value for an optical phase associated with a said track location at which the data transducer head is being positioned.

10. The disk drive set forth in claim 9 further comprising temperature sensor means for sensing changes in temperature within the disk drive and wherein the head position controller means carries out the calibration routine upon sensed predetermined changes in temperature.

11. The disk drive set forth in claim 9 wherein there are four adjacent servo track locations within the contiguous region.

12. The disk drive set forth in claim 11 wherein the contiguous region containing the four adjacent servo track locations is located in an outer radial region of the data storage surface.

13. The disk drive set forth in claim 9 wherein there are plural contiguous regions of plural adjacent servo track locations, the plural contiguous regions being separated by concentric data track locations.

14. The disk drive set forth in claim 13 wherein the processing means calculates and stores a slope value derived from an average centerline position value obtained from a servo track location associated with a said optical phase from one of said plural contiguous regions and from an average centerline position value obtained from a servo track associated with the same said optical phase located in another of said contiguous regions.

15. The disk drive set forth in claim 14 wherein the processing means calculates and stores a slope value for each optical phase.

16. The disk drive set forth in claim 14 further comprising at least one servo sector means embedded within each said data track location, said servo sector means including prerecorded track centerline information readible by the data transducer head.

* * * * *